Jan. 29, 1935.          C. G. SUITS           1,989,500
            ELECTRIC TRANSLATING CIRCUIT
            Original Filed Sept. 17, 1930
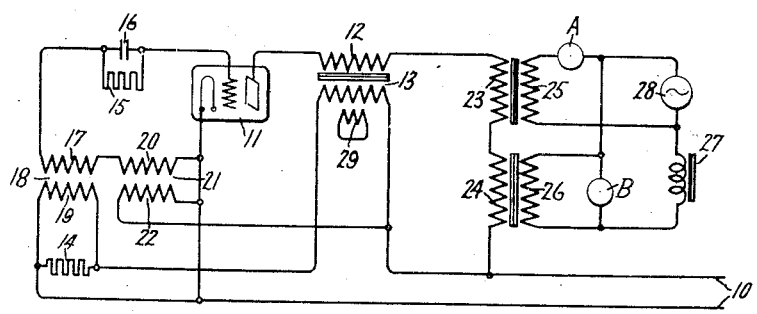
Inventor:
Chauncey G. Suits,
by Charles E. Mullen
   His Attorney.

Patented Jan. 29, 1935

1,989,500

UNITED STATES PATENT OFFICE 1,989,500

ELECTRIC TRANSLATING CIRCUIT

Chauncey G. Suits, Schenectady, N. Y., assignor to General Electric Company, a corporation of New York Original application September 17, 1930, Serial No. 482,535. Divided and this application November 27, 1931, Serial No. 577,445

8 Claims. (Cl. 171—97)

My invention relates to electric translating circuits, and more particularly to such circuits adapted to energize alternately a pair of electro-responsive devices. This application is a division of my copending application Serial No. 482,535, filed September 17, 1930, and assigned to the same assignee as the present application.

Heretofore there have been devised numerous electric translating circuits for sequentially operating a plurality of electro-responsive devices. Many of these arrangements of the prior art have included complicated organizations of moving parts which have been subject to wear and have required repeated adjustments. My invention relates to an electric translating circuit for alternately energizing a pair of electro-responsive devices which may be supplied from any suitable source of periodic current, although I prefer to use an arrangement for generating low frequency periodic current of the type disclosed and claimed in my aforementioned application.

It is an object of my invention, therefore, to provide an improved electric translating circuit for alternately energizing a pair of electro-responsive devices which will overcome the above-mentioned disadvantages of the arrangements of the prior art and which will involve the use of no moving parts. While my invention is of general application, it is particularly adapted for use in intermittently turning off and on electric lamps such as are used in beacon lights, danger signals, traffic signals, etc.

In accordance with one embodiment of my invention, one of a pair of electro-responsive devices is connected in series with a variable impedance device, while the other of the devices is connected in parallel with a second variable impedance device. The impedance of these two devices is adapted to be varied in accordance with a periodic control current in such a manner that, when this current approaches its maximum value, the impedance of the devices is changed to its maximum or minimum value, while, when the control current has its minimum value, the impedance of the devices is changed to the other extreme of its range of variation. Under one condition, one of the electro-responsive devices is substantially short circuited while the impedance in series with the other device has its minimum value so that it is energized, while under the other condition, a relatively large impedance is in series with one of the devices so that it is deenergized and the shunt around the other device has a very high impedance so that it is energized.

For a better understanding of my invention, together with other and further objects thereof, reference is had to the following description taken in connection with the accompanying drawing and its scope will be pointed out in the appended claims. The single figure of the accompanying drawing illustrates an arrangement for alternately energizing a pair of electric signal devices including a preferred arrangement for generating a periodic current, which forms the subject matter of my aforesaid copending application.

Referring now to the drawing, there is illustrated an arrangement for alternately energizing the signaling devices A and B from a source of alternating current 28. This arrangement includes a circuit for generating a source of low frequency periodic current comprising a source of current 10, an electric valve 11 provided with a cathode, an anode, and a control grid, and the saturating winding 12 of a reactor 13 provided with a small short-circuited winding 29. The electric valve 11 may be of any of the several types well-known in the art, but I prefer to use a vapor electric discharge valve. The main winding of the reactor 13 is connected across the source 10 through a resistor 14. The grid cicuit of the electric valve 11 includes a high resistance grid leak 15, a condenser 16, the secondary winding 17 of a transformer 18, the primary winding 19 of which is connected across the resistor 14, and the secondary winding 20 of a transformer 21, the primary winding 22 of which is connected across the source 10. The load circuit of the low frequency generator includes the saturating windings 23 and 24 of reactors 25 and 26 respectively. The reactor 25 is connected in series with the signalling device A and the reactor 26 is connected in parallel to the signalling device B, the circuits of the two signalling devices being connected in parallel across a source of alternating current 28. The circuit of the device B also includes a current limiting reactor 27 for purposes explained hereinafter.

For the purposes of explanation it will be assumed that the circuit 10 has just been energized and that no current is as yet flowing in the anode circuit of the electric valve 11. The potential applied to the grid of the electric valve 11 through the transformer 21 is in phase with its anode potential so that a current tends to flow in the valve 11 whenever its anode potential is positive. As the current builds up in the valve 11 and in the saturating winding 12, the reactor 13 becomes saturated and its impedance greatly decreases, allowing current to flow from the source 10 through the reactor 13 and the resistor 14. As current builds up in this circuit, the potential across the resistor 14 builds up and is applied to the grid of the valve 11 through the transformer 18. This potential is opposite in phase to that supplied by the transformer 21 and is so proportioned that, when the impedance of the reactor 13 is a minimum, it will more than neutralize the potential supplied by the transformer 21 and will make the grid of the electric valve 11 negative when its anode potential is positive, thus interrupting the flow of current in the valve. When the current is interrupted in the saturating winding 12 of the reactor 13, the flux in this reactor dies down, its energy being dissipated in the winding 29, and its impedance again increases to its maximum value with a corresponding decrease in the potential applied to the grid of the valve 11 through the transformer 18. The potential applied to the grid of the valve 11 through the transformer 21 again predominates and renders the valve 11 conducting. The grid leak 15 and condenser 16 are provided to allow the negative potential impressed upon the grid 11, when the impedance of the reactor 13 is a minimum, to slowly leak off the grid. The resulting current flowing in the saturating winding 12 and in the output circuit 23 and 24 comprises a series of rectified half-waves flowing intermittently. The number of half-waves in each train and the interval between successive trains, that is, the frequency of the periodic current, being dependent among other things upon the following factors; the constants of the electric valve 11, the grid leak and condenser 15 and 16 and the time required to saturate the reactor 13. The most appropriate value of each of these factors may be easily selected and it has been found that periodic current of frequencies ranging from 10 cycles per second to one cycle per minute may be readily obtained. While I have shown a single electric valve 11 so that the output current constitutes a series of rectified half-waves it will be obvious to those skilled in the art that a pair of valves might be substituted in lieu thereof and thus obtain full wave rectification.

My present invention is illustrated by an arrangement which utilizes the periodic current generating circuit just described to alternately turn off and on the signal devices A and B. When the current flowing in the saturating windings 23 and 24 of reactors 25 and 26, respectively, is a maximum, the impedance of these reactors is a minimum and the current will flow from the source 28 through the device A, but the current will be shunted from the device B through the low impedance reactor 26 with the result that this device will not be energized. The reactor 27 is included in the circuit of the device B to limit the current through the reactor 26 when its impedance is very low. When the current is interrupted in the saturating windings 23 and 24, the impedance of the reactors 25 and 26 is a maximum, with the result that insufficient current will flow in the circuit of the device A to energize it while now current from the source 28 will flow through the device B. The reactor 27 serves also to equalize the potential applied to the device B with that applied to the device A through the reactor 25 when the impedance of the reactor is low, so that the devices A and B will be energized alternately and equally. The impedance of the devices 25 and 26, when in an unsaturated condition, should bear such a relation to the impedance of the devices A and B that the current through the device A is limited to a value insufficient to operate this device, while the current by-passed from the device B should be only a fraction of the operating current of the device B, to insure its satisfactory operation. On the other hand, the impedance of the reactors 25 and 26, when in a saturated condition, should be of such a value that the voltage across the device A, which is equal to the supply voltage less the impedance drop across the reactor 25, is sufficiently high to insure the operation of the device A, while at the same time the greater portion of the supply voltage of the source 28 is consumed across the current limiting impedance 27, so that that represented as the impedance drop across the reactor 26 is insufficient to energize the device B. Obviously, the particular ohmic values of the impedances of the reactors 25, 26 and 27 and the devices A and B will depend upon the operating voltage of the system and the current requirements of the devices A and B.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A system for alternately energizing a pair of electro-responsive devices comprising a circuit including one of said devices in series with a variable impedance element, a second circuit comprising an impedance element in series with the other one of said devices, a second variable impedance element connected in parallel with said other device, a source of energy connected to each of said circuits, and means for intermittently and simultaneously varying the values of said variable impedance elements.

2. A system for alternately energizing a pair of electro-responsive devices comprising a circuit including one of said devices in series with a variable impedance element, a second circuit comprising an impedance element in series with the other one of said devices, a second variable impedance element connected in parallel with said other device, a source of energy connected to each of said circuits and a source of intermittent unidirectional impulses arranged to vary simultaneously the values of said variable impedance elements.

3. A system for alternately energizing a pair of electro-responsive devices comprising a circuit including one of said devices in series with a saturating reactor, a second circuit comprising an impedance element in series with the other one of said devices, a second saturating reactor connected in parallel with said other device, a source of energy connected to each of said circuits, and means for intermittently and simultaneously saturating said reactors.

4. A system for alternately energizing a pair of electro-responsive devices comprising a circuit including one of said devices in series with a saturating reactor, a second circuit comprising an impedance element in series with the other one of said devices, a second saturating reactor connected in parallel with said other device, a source of energy connected to each of said circuits, and a source of intermittent unidirectional impulses arranged to simultaneously and intermittently saturate said reactors.

5. In combination, a circuit comprising an electro-responsive device in series with a variable impedance element, a second circuit comprising an impedance device in series with a variable impedance element, an electro-responsive element connected in parallel with said variable impedance element, a source of energy for each of said circuits, said variable impedance element normally having such relation to the impedances presented by said electro-responsive devices that only one of said electro-responsive devices is energized, and means for simultaneously varying the values of said variable impedance elements thereby to deenergize one of said electro-responsive means and to energize the other of said electro-responsive means.

6. In combination, a circuit comprising an electro-responsive device connected in series with a saturable reactor, a second circuit comprising an impedance device connected in series with a saturating reactor, an electro-responsive device connected in parallel with said second saturating reactor, a source of energy connected to each of said circuits, said saturating reactors normally having an impedance relation to the impedances presented by said electro-responsive devices that only one of said electro-responsive devices is energized, and means for simultaneously saturating both said saturating reactors thereby to deenergize one of said electro-responsive devices and to energize the other of said electro-responsive devices.

7. A system for alternately energizing a pair of electro-responsive devices comprising a circuit including one of said devices in series with a variable impedance element, a second circuit comprising an impedance element in series with the other one of said devices, a second variable impedance element connected in parallel with said other device, a source of energy connected to each of said circuits, and means for periodically and simultaneously varying the values of said variable impedance elements.

8. A system for alternately energizing a pair of electro-responsive devices comprising a circuit including one of said devices in series with a saturating reactor, a second circuit comprising an impedance element in series with the other one of said devices, a second saturating reactor connected in parallel with said other device, a source of energy connected to each of said circuits, and means for periodically and simultaneously saturating said reactors.

CHAUNCEY G. SUITS.